United States Patent
Xu

(10) Patent No.: US 10,082,276 B2
(45) Date of Patent: Sep. 25, 2018

(54) INSTALLATION MECHANISM OF LED LIGHTING

(71) Applicants: Self Electronics Co., Ltd., Ningbo, Zhejiang (CN); Wanjiong Lin, Zhejiang (CN); Self electronics USA Corporation, Norcross, GA (US)

(72) Inventor: Guojun Xu, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 15/629,913

(22) Filed: Jun. 22, 2017

(65) Prior Publication Data

US 2017/0370559 A1    Dec. 28, 2017

(30) Foreign Application Priority Data

Jun. 22, 2016  (CN) .......................... 2016 1 0470818

(51) Int. Cl.
| | |
|---|---|
| *F21V 21/00* | (2006.01) |
| *F21V 17/18* | (2006.01) |
| *F21V 17/12* | (2006.01) |
| *F21V 21/03* | (2006.01) |
| *F21Y 115/00* | (2016.01) |
| *F16B 5/10* | (2006.01) |
| *F16B 21/04* | (2006.01) |
| *F16B 21/09* | (2006.01) |
| *F21Y 115/10* | (2016.01) |

(52) U.S. Cl.
CPC .............. *F21V 17/18* (2013.01); *F21V 17/12* (2013.01); *F21V 21/03* (2013.01); *F16B 5/10* (2013.01); *F16B 21/04* (2013.01); *F16B 21/09* (2013.01); *F21Y 2115/00* (2016.08); *F21Y 2115/10* (2016.08)

(58) Field of Classification Search
CPC .. F16B 21/04; F16B 21/09; F16B 5/10; F21V 17/12; F21V 17/18; F21V 21/03; F21Y 2115/00
See application file for complete search history.

(56) References Cited

U.S. PATENT DOCUMENTS

| | | | |
|---|---|---|---|
| 9,222,651 B1* | 12/2015 | Vlad | F21V 19/001 |
| 2013/0134456 A1* | 5/2013 | Lu | F21V 5/002 257/89 |
| 2014/0029292 A1* | 1/2014 | Mizushiro | G02B 6/0038 362/565 |

* cited by examiner

*Primary Examiner* — Ali Alavi
(74) *Attorney, Agent, or Firm* — Wang Law Firm, Inc.

(57) ABSTRACT

An installation mechanism of LED lighting includes a house and a mounting plate. The house includes a mounting slot provided on a side wall along a radial direction thereof. The mounting slot includes a implantation portion and a catch portion communicating with the implantation portion. The catch portion includes at least one catching arm provided on one of two opposite side walls thereof. The mounting plate includes two catch edges inserted in the catch portion. The implantation portion is configured for presetting the mounting plate. Each of the catch edge has a Z-typed shape in a cross section of the mounting plate along the axial direction thereof. A free edge of the Z-typed catch edge is inserted into a gap between the catching arm and the bottom of the mounting slot.

10 Claims, 4 Drawing Sheets

INSTALLATION MECHANISM OF LED LIGHTING

RELATED APPLICATION

This present application claims benefit of the Chinese Application, CN 201610470818.9, filed on Jun. 22, 2016.

BACKGROUND

1. Technical Field

The present application relates to a lighting device, and more particularly to an installation mechanism of LED lighting.

2. Description of the Related Art

Light emitting diode (LED) is growing in popularity due to decreasing costs and long life compared to incandescent lighting and fluorescent lighting. Recently, a number of LED lighting apparatuses have been designed to replace the halogen apparatus, as well as other traditional incandescent or fluorescence lighting apparatuses. In some places such as exhibition halls, jewelry stores, museums, supermarkets, and some home lighting, such as large villas, will use a lot of strip LED lamps. Moreover, in addition to lighting equipments, such as general traffic lights, billboards, motorlights, etc., also use light-emitting diodes as light source. As described above, for the light-emitting diodes as a light source, the advantage is power saving, and the greater brightness. Therefore, the use has been gradually common.

With the popularity of LED lamps, an LED table lighting is more and more widely used in some home. The LED table lighting has a biggest feature of thin. In order to make the LED table lighting become thinner, designers have made great effort. However, it give some trouble to install these increasingly thin LED table lighting. Usually, the LED table lighting is mounted by double-sided adhesive, But the double-sided adhesive may be susceptible to temperature, humidity and other environmental so as to result in failure, and after a long time the viscosity thereof decreases, which may finally result in falling off. Moreover, the LED table lighting may be directly mounted by screws. However, when using screws, the screws are either exposed directly to the outside, which affects the appearance, or it is installed by adding a decorative ring outside the screw, which will increase the cost and the thickness of the entire LED table lighting. As well as a mounting clip is use to install the LED table lighting, that is, the entire lamp body is clipped in a mounting clip. However, this installation method will affect the aesthetic and increase costs because of the installation of the mounting clip.

Therefore, it is necessary to provide an installation mechanism of LED lighting which makes it possible to solve the above problem.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The present application is illustrated by way of example and not by way of limitation in the figures of the accompanying drawings. It should be noted that references to "an" or "one" embodiment in this application are not necessarily to the same embodiment, and such references mean at least one.

Figure 1:
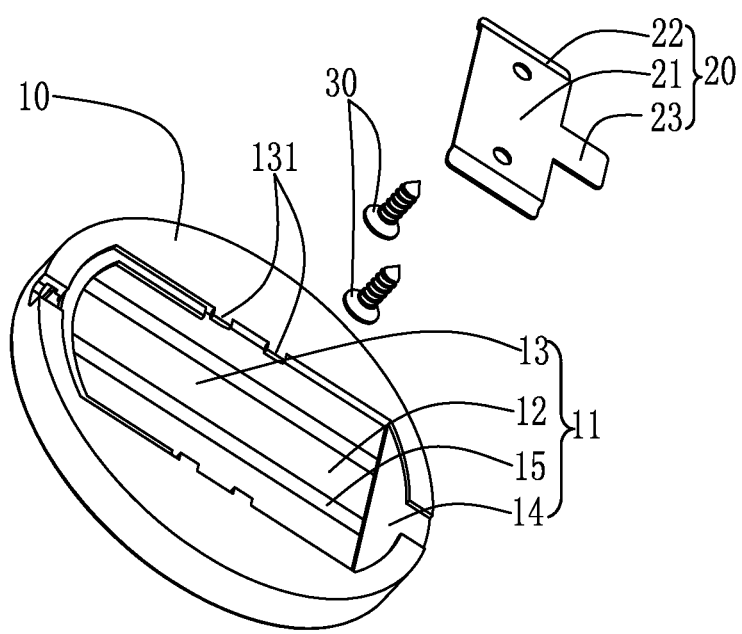
FIG. 1 is an explored view of an installation mechanism of LED lighting according to a first embodiment of the invention.
Figure 2:
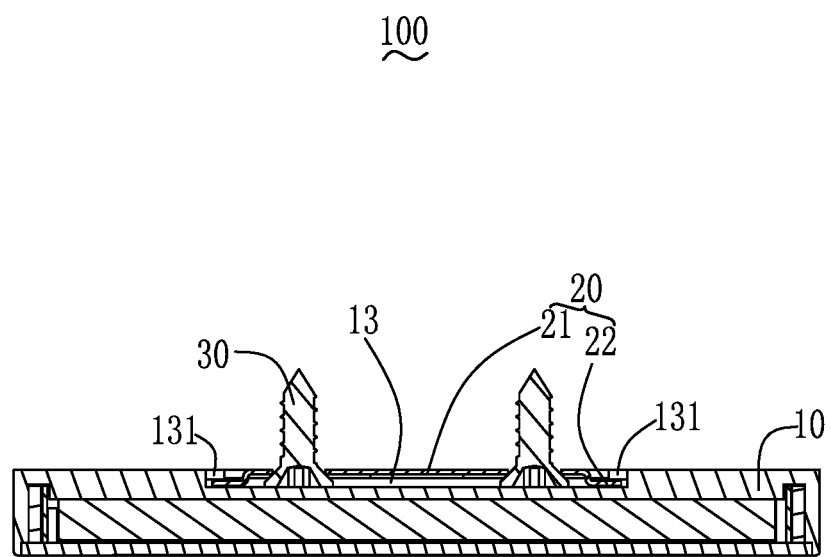
FIG. 2 is a cross section view of the installation mechanism of LED lighting of FIG. 1.
Figure 3:
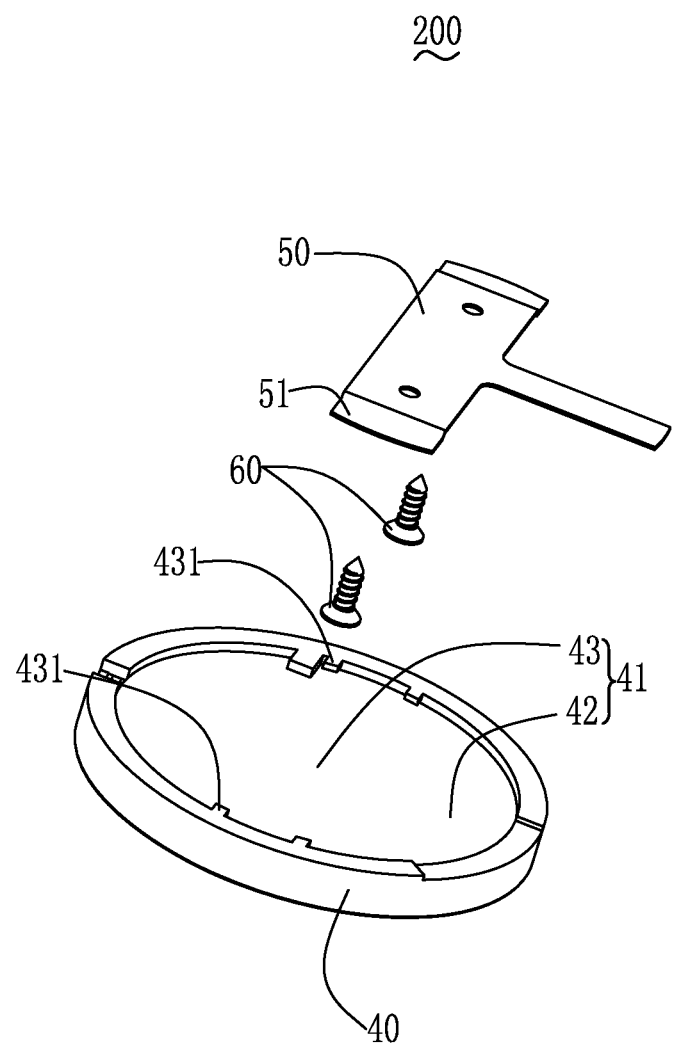
FIG. 3 is an explored view of an installation mechanism of LED lighting according to a second embodiment of the invention.

Referring to FIG. 1 to FIG. 3, an installation mechanism 100 of LED lighting according a first embodiment is shown. The installation mechanism 100 includes a house 10, a mounting plate 20 clamped in the house 10, and at least one screw 30 for fixing the mounting plate 20. It can be understood that the house 10 is configured for mounting all of components of LED lighting, such as circuit board, lighting module, cover, wire accessory, and so on, which is not the focus of the present invention and will not be described in detail.

The house 10 is used to receive all kinds of lighting modules and provides a mounting slot 11 on a side wall thereof along an axial direction thereof. The mounting slot 11 is a closed, one-side open groove and includes an implantation portion 12 and a catch portion 13 communicating with the implantation portion 12. In the first embodiment, the mounting slot 11 has a rectangle shape and is made by injection molding, or turn milling, or the like. The implantation portion 12 is configured for presetting the mounting plate 20, that is, at the time of installation, the mounting plate 20 is firstly placed in the implantation portion 12 and then the housing 10 is pushed into the catch portion 13. At least two catching arms 131 are provided on two opposite side walls of the catch portion 13, respectively. In the present embodiment, four catching arms 131 are provided on two opposite side walls of the catch portion 13, respectively. It is appreciated that two catching arms 131 is arranged each of the two side walls of the catch portion 13. The catching arms 131 are spaced apart from the bottom of the mounting slot 11 so that the mounting plate 20 can be clamped between the catching arms 131 and the bottom of the mounting slot 11. The catch portion 13 is arranged side by side with the implantation portion 12 so that the mounting plate 20 can move between the catch portion 13 and the implantation portion 12. A guide slot 14 is provided on the side wall of the house 10 on which the mounting slot 11 is provided. The guide slot 14 is communicated with the side wall of the house 10 along the axial direction of the house 10 and the mounting slot 11. The action and operating principle of the guide slot 14 will be described below.

The mounting plate 20 may be made of steel plate by stamping and includes a body 21, and two catch edges 22 provided on two end of the body 21. The body 21 may be a flat plate, one side of which is attached to the bottom of the mounting slot 11 and the other side of which is attached onto a mounting surface of a device, such as a cabinet, an exhibition cabinet, or the like. The two catch edges 22 are clipped into the catch portion 13, respectively. In a cross section of the mounting plate 20 along the axial direction thereof, each of the catch edges 22 has a Z-typed shape. A free edge of the Z-typed catch edge 22 is inserted into a gap between the catching arm 131 and the bottom of the mounting slot 10. Therefore, a maximum distance between the two catch edges 22 of the mounting plate 20 is equal to a width of the mounting slot 11 along a direction perpendicular to the arrangement direction of the implantation portion 12 and the catch portion 13. A shape and area of the mounting plate 20 is same with that of the implantation portion 12 so as to engage the implantation portion 12 with the mounting plate 20. In order to facilitate to mount and locate, the mounting plate 20 has a guide tongue 23 which cooperates with the guide slot 14 of the mounting slot 11 to position the housing 10 before installation. That is to say, when the mounting plate 20 is accommodated into the implantation portion 12, the guide tongue 23 can be firstly accommodated in the guide slot 14, thereby ensuring that the mounting plate 23 is overlapped with the implantation portion 12.

The screw 30 is used to fix the mounting plate 20 onto the mounting surface. In the present embodiment, two screws 30 are supplied to fix the mounting plate 20. The screw 30 is a standard part known to those skilled in the art and will not be described again. Normally, when the two screws 30 is screwed into the mounting surface to fix the mounting plate 20, the studs of the two screws 30 will be exposed to the outside of the mounting plate 20. Therefore, in order to prevent the studs of the two screws 30 from obstructing the mounting plate 20 to be smoothly pushed into the catch portion 13, the bottom of the mounting slot 11 also includes at least one recess 15. In the present embodiment, two recesses 15 are provided on the bottom of the mounting slot 11. The two recesses 15 are configured for receiving the part of the screws 30 which protrude out of the mounting plate 20, i.e., the nail portion.

At the time of installation, the mounting plate 20 is firstly fixed on the mounting surface by the screws 30, and the implantation portion 12 of the mounting slot 11 of the house 10 is aligned with the mounting plate 20 and engaged onto the mounting plate 20. Finally, the house 10 is pushed toward the mounting plate 20 so that the mounting plate 20 is inserted into the catch portion 13 to complete the installation.

As described above, since the housing 10 of the installation mechanism 100 has the mounting slot 11 and the mounting slot 11 is divided into the implantation portion 12 and the catch portion 13, the mounting plate 20 can be clamped between the catch portion 13 and the bottom of the mounting slot 11, and the mounting plate 20 and the screw 30 for fixing the mounting plate 20 can be hidden. Therefore, the installation mechanism 100 of the LED lighting is not affected by environmental factors, such as temperature, humidity, or the like. Moreover, the mounting plate 20 and the screws 30 can be hidden, so the beauty and integrity of the LED lighting may be increased.

Figure 4:
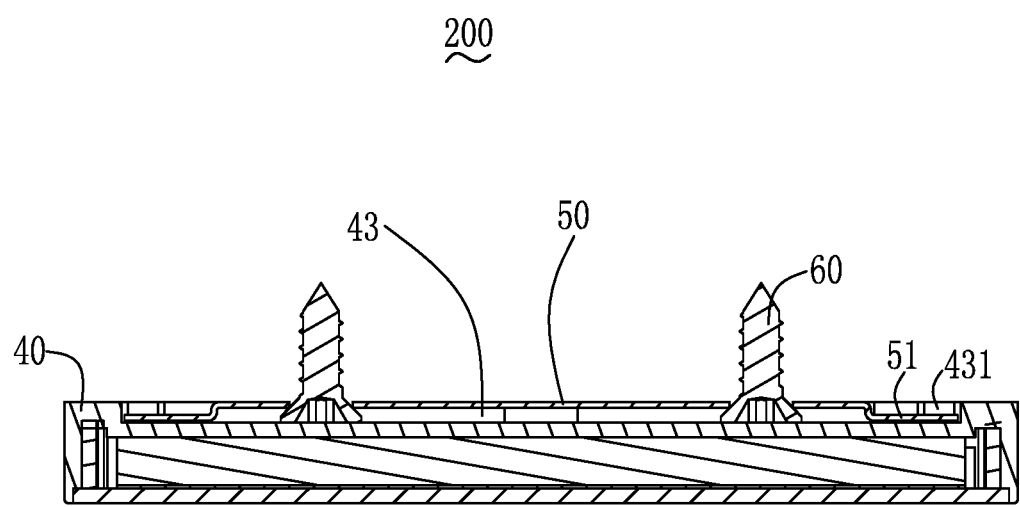
FIG. 4 is a cross section view of the installation mechanism of LED lighting of FIG. 3.

Referring to FIG. 3 and FIG. 4, an installation mechanism 200 of LED lighting according to a second embodiment is shown. The installation mechanism 200 includes a house 40, a mounting plate 50 clipped onto the house 40, and at least one screw 60 for fixing the mounting plate 50.

The second embodiment is different from the first embodiment in that the shape of the house 40 is different from that of the house 10 of the first embodiment. The house 40 of the second embodiment is circular in shame, and it is of course understood that the circular house 40 may be provided with the rectangular mounting slot 11 of the first embodiment. However, when the side wall of the house 40 along an axial direction thereof is small, the area of the rectangular mounting slot 11 will smaller and is disadvantageous to assemble with the mounting plate 50, thereby reducing the stability of the LED lighting. Therefore, in the second embodiment, the house 40 is provided a mounting slot 41 on a side wall thereof along a radial direction thereof. The mounting slot 41 is circular in shape and includes an implantation portion 42, and a catch portion 43 communicating with the implantation portion 42. The catch portion 43 is provided at least one catching arm 431 on one of two opposite side walls thereof, respectively. Since the mounting slot 41 is circular in shape, a catch edge 51 of the mounting plate 50 is also circular and a diameter of the circular catch edge 51 is equivalent to that of the circular mounting slot 41. That is to say, the diameter of the mounting slot 41 is equal to a maximum distance between the two catch edges 51 of the mounting plate 50.

At the time of installation, the mounting plate 50 is firstly fixed to a mounting surface by the screw 60, and then the implantation portion of the mounting slot 41 of the housing is aligned with the mounting plate 50 and engaged onto the mounting plate 50. Finally, the house 40 is rotated so that the mounting plate 50 is inserted into the catch portion 43 to complete the installation.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An installation mechanism of LED lighting, comprising:
   a house, the house comprising a mounting slot provided on a side wall along an axial direction thereof, the mounting slot comprising an implantation portion and a catch portion communicating with the implantation portion, the catch portion comprising at least one catching arm provided on one of two opposite side walls thereof; and
   a mounting plate, the mounting plate comprising two catch edges inserted in the catch portion, the implantation portion being configured for presetting the mounting plate, each of the catch edge having a Z-typed shape in a cross section of the mounting plate along the axial direction of the house, a free edge of the Z-typed catch edge being inserted into a gap between the catching arm and the bottom of the mounting slot.

2. The installation mechanism of LED lighting as claimed in claim 1, wherein the mounting slot is rectangular in shape, the mounting plate is also rectangular in shape and received in the mounting slot.

3. The installation mechanism of LED lighting as claimed in claim 2, wherein the implantation portion is arranged side by side with the catch portion.

4. The installation mechanism of LED lighting as claimed in claim 3, wherein a width of the mounting slot along an arranging direction of the implantation portion and the catch portion is equal to a maximum distance between two catch edges of the mounting portion.

5. The installation mechanism of LED lighting as claimed in claim 1, wherein the mounting slot is circular in shape, the catch edge of the mounting plate is circular in shape, a diameter of the catch edge is equal to that of the mounting slot.

6. The installation mechanism of LED lighting as claimed in claim 5, wherein the implantation portion is provided intersecting the catch portion.

7. The installation mechanism of LED lighting as claimed in claim 6, wherein a diameter of the mounting slot is equal to a maximum distance between the two catch edges of the mounting plate.

8. The installation mechanism of LED lighting as claimed in claim 1, wherein the mounting plate is fixed on a mounting surface by at least one screw, the mounting slot is provided at least one recess opened on a bottom thereof, the recess is configured for receiving a part of the screw which protrudes out of the mounting plate.

9. The installation mechanism of LED lighting as claimed in claim 1, wherein the mounting slot is a closed slot, and one side of the mounting slot has an open provided thereon.

10. The installation mechanism of LED lighting as claimed in claim 9, wherein the house further comprises a guide slot provided on the side wall in which the mounting slot is disposed, the guide slot is communicated with a side wall of the house along an axial direction thereof, the mounting plate comprises a guide tongue, the guide tongue is received in the guide slot when the mounting plate is received into the implantation portion.

* * * * *